United States Patent [19]

Crane

[11] Patent Number: 5,327,938
[45] Date of Patent: Jul. 12, 1994

[54] ADJUSTABLE ORIFICE FITTING CARRIER FOR A PIPELINE ORIFICE FITTING

[75] Inventor: Dreu E. Crane, Broken Arrow, Okla.

[73] Assignee: Crane Manufacturing, Inc., Tulsa, Okla.

[21] Appl. No.: 990,172

[22] Filed: Nov. 20, 1992

[51] Int. Cl.$^5$ ............................................. F15D 1/02
[52] U.S. Cl. ...................................... 138/44; 138/45; 138/94.3
[58] Field of Search .................. 138/44, 45, 94, 94.3; 251/326; 73/861.61, 861.62, 861.58

[56] References Cited

U.S. PATENT DOCUMENTS

| | | | |
|---|---|---|---|
| 1,273,597 | 7/1918 | Fisher . | |
| 1,808,715 | 6/1931 | Reynolds | 138/44 |
| 1,924,125 | 8/1928 | Linderman . | |
| 2,014,682 | 9/1935 | Greene | 138/44 |
| 2,050,544 | 8/1936 | Robinson et al. | 138/44 |
| 2,088,968 | 8/1937 | Muff | 138/44 |
| 2,448,071 | 8/1948 | Anderson | 138/44 |
| 2,585,290 | 2/1952 | Walker . | |
| 2,964,063 | 12/1960 | Guenther | 138/44 |
| 3,817,287 | 6/1974 | Aitken | 138/44 |
| 4,014,366 | 3/1977 | Critendon | 138/94.3 |
| 4,130,128 | 12/1978 | Kaneko | 138/45 |
| 4,191,216 | 3/1980 | Connolly | 138/45 |
| 4,370,893 | 2/1983 | Combes . | |
| 4,393,722 | 7/1983 | Scott | 73/861.61 |
| 4,399,708 | 8/1983 | Van Scoy . | |
| 4,413,532 | 11/1983 | Van Scoy . | |
| 4,422,339 | 12/1983 | Gall et al. . | |
| 4,478,251 | 10/1984 | Sanchez . | |
| 5,042,531 | 8/1991 | Foster et al. . | |
| 5,094,272 | 3/1992 | Foster et al. . | |
| 5,181,542 | 1/1993 | Wass et al. | 73/861.61 |
| 5,186,474 | 2/1993 | Jacobs | 138/44 |

FOREIGN PATENT DOCUMENTS 0652075 4/1951 United Kingdom ............... 138/45

OTHER PUBLICATIONS

Anderson, Ken E.; Bill D. Berger. *Gas Handling and Field Processing.* PennWell Books; Tulsa, Oklahoma, 1980.

*Manual of Petroleum Measurement Standards.* Chapter 14–Natural Gas Fluids Measurement. American Petroleum Institute: Washington, D.C., Sep. 1985.

Primary Examiner—Philip R. Coe
Assistant Examiner—James F. Hook
Attorney, Agent, or Firm—Head & Johnson

[57] ABSTRACT

An adjustable orifice fitting carrier assembly for an orifice fitting having a receptacle and being interposed in a pipeline. The carrier assembly includes a carrier body receivable in the receptacle of the fitting to hold a flat, circular orifice disc having a center orifice therethrough, the orifice disc being perpendicular to the flow through the pipeline. A carrier holding plate is receivable in the receptacle and is in communication with the carrier body. An adjustment mechanism is provided to move the carrier body and the orifice disc in a first direction across the diameter of the pipeline while within the orifice fitting. An adjustment mechanism is also provided to move the carrier body and the orifice disc in a second direction across the diameter of the pipeline, perpendicular to the first direction, in order to concentrically align the center orifice with the axis of the pipeline.

5 Claims, 3 Drawing Sheets

ADJUSTABLE ORIFICE FITTING CARRIER FOR A PIPELINE ORIFICE FITTING

BACKGROUND OF THE INVENTION

1. Field of the Invention

The present invention pertains to an adjustable orifice fitting carrier assembly for measurement of flow through a pipeline. In particular, the present invention pertains to an orifice fitting carrier assembly that may be adjusted to concentrically align the center orifice with the axis of the pipeline while the carrier assembly is in the fitting.

2. Prior Art

The flow of natural gas or other fluids through a pipeline may be measured by placing a restriction, such as an orifice plate, within the pipeline in order to cause a reduction in pressure or pressure drop as the fluid flows through the opening in the orifice plate. The pressure of the fluid drops abruptly as it flows through the orifice and it reaches a minimum value a short distance beyond. There is a relationship between the amount of this pressure drop and the rate of gas or fluid flow through the opening in the orifice plate. Pressure connections for attaching a differential gauge on both sides of the orifice plate are provided to measure the difference in pressure.

Periodically, because of wear and for other reasons, it will be necessary to remove and replace the orifice plate retained within the fitting. When the orifice plate is installed, the axis of the opening of the orifice plate must be at the center of the pipeline. The concentric positioning of the orifice plate is required to achieve an accurate flow measurement and because of regulations which require the concentric alignment. Additionally, regulations such as those recently promulgated by the American Petroleum Institution set forth the relative positioning of the orifice fitting to the carrier which holds the orifice plate. For example, the internal diameter of the carrier must not vary significantly from the diameter of the fitting.

There is a need, therefore, to provide a mechanism for the vertical and horizontal adjustment of the carrier assembly to permit concentric alignment of the bore of the orifice fitting with the pipeline.

It is a principal object and purpose of the present invention to provide a mechanism for the vertical and horizontal adjustment of the orifice plate to permit concentrical alignment of the bore of the orifice fitting with the pipeline.

It is an additional object and purpose of the present invention to provide a mechanism for vertical and horizontal adjustment of the carrier plate while the carrier assembly is in the field and within the orifice fitting.

It is a further object and purpose of the present invention to provide an adjustable carrier assembly to be used with existing orifice fittings.

SUMMARY OF THE INVENTION

The present invention provides an adjustable carrier assembly which would be received within and fit within an orifice fitting interposed in a pipeline and used to measure the flow of fluid through the pipeline. The orifice fitting has a passage coaxial with the pipeline. The orifice fitting includes a receptacle in communication with the passage and substantially perpendicular to the axis of the passage.

A carrier body is substantially circular and receivable within the receptacle. The interior diameter of the carrier body will be the same size as the diameter of the passage.

The carrier body retains and holds a flat, circular orifice disk which includes a center orifice therethrough. The orifice disk is perpendicular to the axis of the passage through the fitting. The carrier body includes a bracket planar with the carrier body and having a pair of extending dowel pins which slidably mate in recesses contained in a carrier holding plate.

After the carrier body and holding plate have been installed within the receptacle they are secured.

A vertical adjustment mechanism may be used to concentrically align the center orifice with the axis of the passage and the pipeline. A vertical adjustment screw extends through an opening in the holding plate and is received into a threaded receptacle in the carrier body. Rotating the vertical adjustment screw will extend or retract an end of the vertical adjustment screw. Adjustment of the screw will, therefore, vertically move both the carrier body and the orifice disk.

The carrier assembly also includes provisions for horizontal adjustment of the carrier body and orifice disk to concentrically align the center orifice. A tapered, adjustable alignment pin is received within a pin receptacle in the orifice fitting. The tapered alignment pin extends through and is received in a seat in the holding plate. A horizontal adjustment screw extends into and seats within a screw recess. The horizontal adjustment screw rotates freely within the recess and the screw is substantially perpendicular to the shank of the alignment pin.

Rotation of the horizontal adjustment screw will, therefore, move the alignment pin with respect to the horizontal adjustment screw. Since the alignment pin is snugly fit within the recess of the orifice fitting and cannot move, rotation of the horizontal adjustment screw causes the holding plate to move horizontally. This, in turn, causes the carrier body and the orifice disk to move in the same direction. Accordingly, rotation of the horizontal adjustment screw causes a horizontal movement of the carrier body and orifice disk.

DETAILED DESCRIPTION OF THE PREFERRED EMBODIMENT

Figure 1:
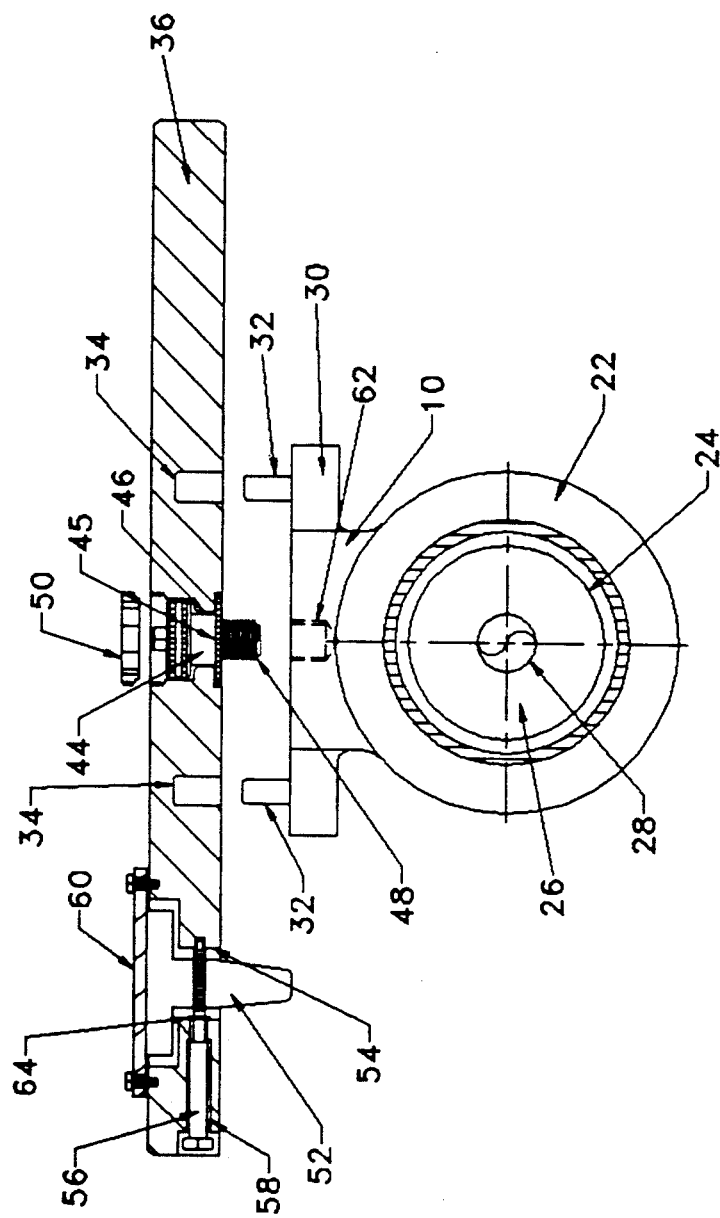
FIG. 1 shows an exploded view of an adjustable orifice fitting carrier assembly constructed in accordance with the present invention wherein the holding plate is in section for ease of comprehension.

Referring to the drawings in detail, FIG. 1 illustrates an adjustable carrier assembly 10 a part of which is in section for clarity.

Figure 2:
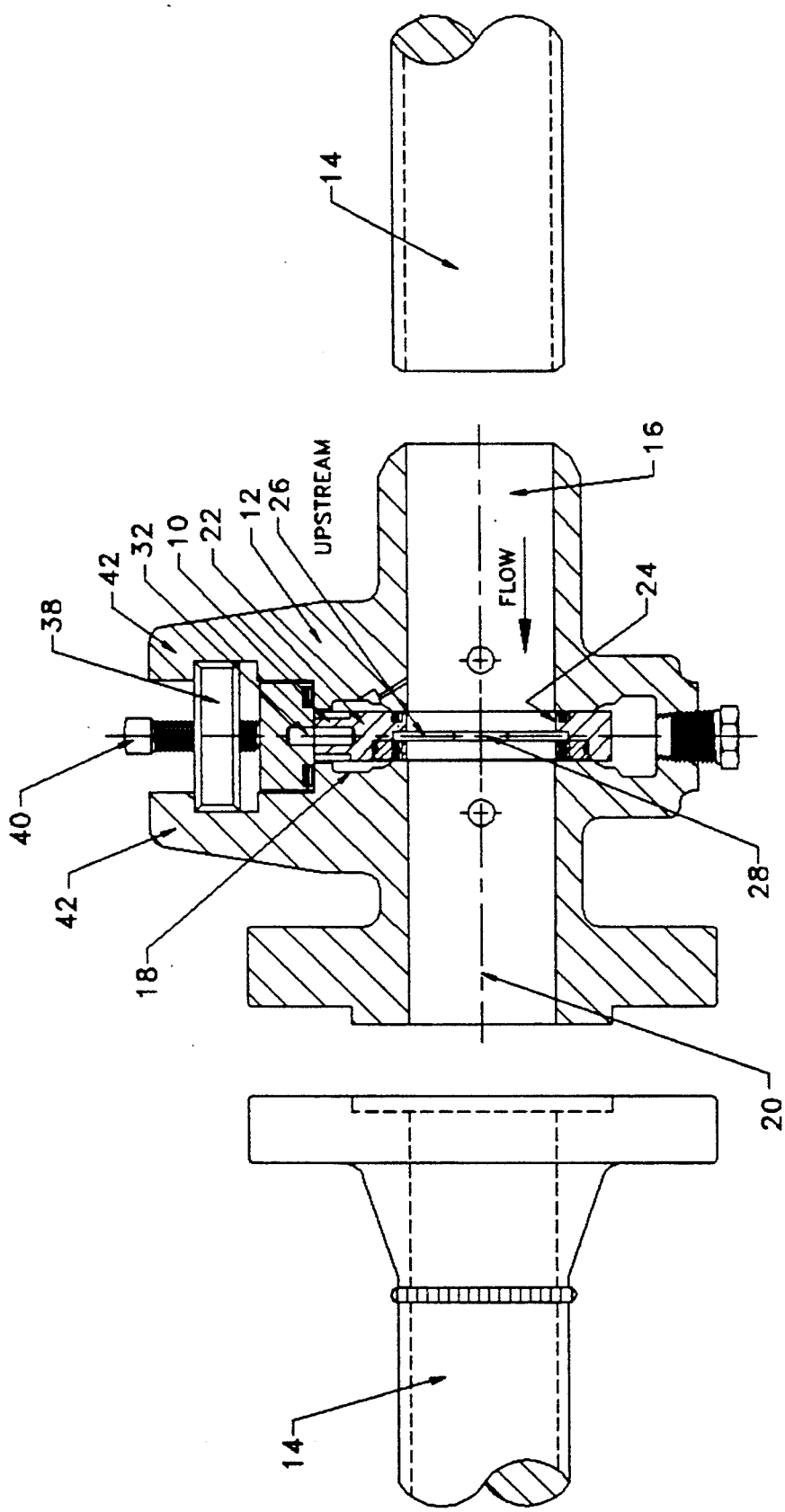
FIG. 2 is a sectional view of an adjustable orifice fitting carrier assembly installed within an orifice fitting interposed in a pipeline.

The carrier assembly 10 would be received in and fit within an orifice fitting 12 as seen in FIG. 2. In its simplest form, the orifice fitting includes a thin flat plate with a circular hole, with its plane perpendicular to the axis of the pipeline and the hole concentric with the pipeline.

The orifice fitting 12 is interposed in a pipeline 14 and is used to measure the flow of gas or fluid through a pipeline. The orifice fitting 12 has a passage 16 which is coaxial with the pipeline 14. The orifice fitting 12 also includes a pocket or receptacle 18 which is in communication with the passage 16. The receptacle 18 is substantially perpendicular to the axis 20 (dashed line) of the passage 16. The orifice fitting is in wide usage in natural gas transmission applications.

With reference to FIG. 1 and continuing reference to FIG. 2, a carrier body 22 is receivable within the receptacle 18. The carrier body 22 is substantially circular. The interior diameter 24 of the carrier body will be the same size as the diameter of the passage 16 of the orifice fitting. The carrier body 22 has a pair of exterior flat faces which mate with and seal with the walls of the receptacle to create a gas or fluid seal, as best seen in FIG. 2.

The carrier body 22 retains and holds a flat, circular orifice disk 26. The orifice disk contains a center orifice 28.

As best seen in FIG. 2, the orifice disk, when installed, is perpendicular to the axis 20 of the passage 16 through the fitting.

The carrier body 22 includes a bracket 30 planar with the carrier body and having a pair of extending dowel pins 32.

The dowel pins 32 will slidably mate in recesses 34 contained in a carrier holding plate 36.

The holding plate 36 is shown in cross-section in FIG. 1. As seen in FIG. 2, the holding plate 36 fits within the receptacle 18 of the orifice fitting 12. Once the carrier body and holding plate 36 have been inserted and installed within the receptacle, they are secured and held in place by a clamp bar 38 and a series of fasteners 40 (one of which is seen in FIG. 2). The fasteners 40 pass through openings (not seen) in the clamp bar 38 and force the holding plate 36 into the receptacle. By turning the fasteners 40 clockwise, the clamp bar will be forced against a pair of jaws 42 which, in turn, secures the holding plate 36 in place.

Once the clamp bar 38 and fasteners 40 are in place, a vertical adjustment mechanism may be used to concentrically align the center orifice 28 with the axis 20 of the passage 16 and the pipeline. A vertical adjustment screw 44 extends through an opening 46 in the holding plate 36. The vertical adjustment screw 44 is held in place within the opening 46 by retainer ring 45. Turning the vertical adjustment screw 44 clockwise will extend the end 48 of the vertical adjustment screw. Likewise, rotating the screw 44 counter-clockwise will retract the end 48. The end 48 of vertical adjustment screw 44 is received into threaded receptacle 62 in bracket 30. Adjustment of the screw 44 will, therefore, vertically move the carrier body 22 and the orifice disk 26 therein. Accordingly, it will be simple to adjust the carrier body 22 and orifice disk after they have been installed in the fitting. A clamp nut 50 may be used to cover the top of the adjustment screw, locking it in place, after the carrier body and disk have been aligned.

Figure 3:
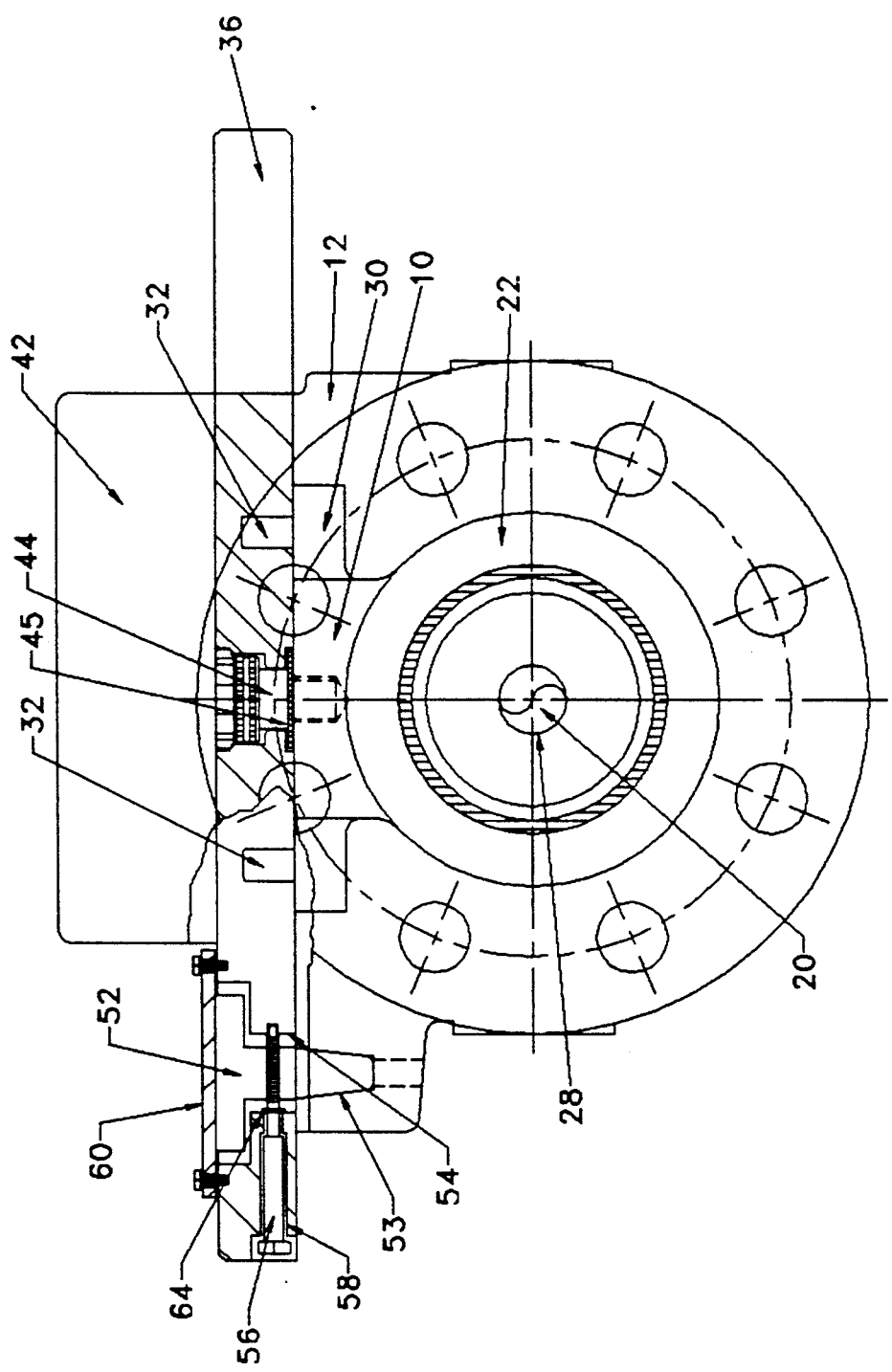
FIG. 3 is a sectional view of the orifice fitting carrier assembly shown in FIG. 1.

The carrier assembly 10 also includes provision for horizontal adjustment of the carrier body and orifice disk. As seen in FIG. 3, a tapered, adjustable alignment pin 52 is received within a pin receptacle 53 in the orifice fitting. The pin receptacle is constructed so that the alignment pin 52 snugly fits therein.

The tapered alignment pin 52 extends through and is received in a seat 54 in the holding plate 36. A horizontal adjustment screw 56, held in place by retainer ring 64, extends and seats within a screw recess 58. The horizontal adjustment screw 56 will be allowed to rotate freely within the screw recess 58. The horizontal adjustment screw 56 is substantially perpendicular to the shank of the alignment pin 52.

Rotation of the horizontal adjustment screw will, therefore, move the alignment pin with respect to the horizontal adjustment screw. The alignment pin 52 is snugly fit within the recess of the orifice fitting and cannot move. Rotation of the horizontal adjustment screw 56, once the fasteners 40 are loosened, will cause the holding plate 36 to move horizontally. This, in turn, will cause the carrier body 22 and the orifice disk 26 to move in the same direction. Accordingly, rotation of the horizontal adjustment screw 56 will cause a horizontal adjustment of the carrier body 22 and orifice disk 26. An alignment pin clamp 60 may be provided to hold the alignment pin 52 securely in place after adjustment.

By adjustment of the horizontal or vertical adjustment or both, the carrier and orifice disk may be adjusted to nearly any position.

Not only may the center orifice 28 be concentrically aligned, but the carrier may be adjusted to be positioned within permissible interior diameter parameters.

Whereas, the present invention has been described in relation to the drawings attached hereto, it should be understood that other and further modifications, apart from those shown or suggested herein, may be made within the spirit and scope of this invention.

What is claimed is:

1. An adjustable orifice fitting carrier assembly for an orifice fitting having an receptacle and interposed in a pipeline, which carrier assembly comprises:
    a) a carrier body receivable in said receptacle of said fitting to hold a flat circular orifice disk having a center orifice therethrough, said orifice disk perpendicular to the flow through said pipeline;
    b) a carrier holding plate receivable in said receptacle and in communication with sad carrier body;
    c) means to move said carrier body and said orifice disk in a first direction with respect to said holding plate in a first direction across the diameter of said pipeline, said means including at least one pin extending from said carrier body, each said pin receivable in a recess in said holding plate, and screw means extending from said carrier holding plate and in communication with said body so that adjustment of said screw means will move said carrier body and said orifice disk; and
    d) means to move said carrier body and said orifice disk by moving said holding plate with respect to said orifice fitting in a second direction across the diameter of said pipeline, perpendicular to said first direction, in order to concentrically align said center orifice with the axis of said pipeline.

2. An adjustable orifice fitting carrier assembly as set forth in claim 1 including a clamp bar and fasteners to secure said holding plate and carrier body in said fitting and create and seal therewith and wherein said screw means is accessible.

3. An adjustable orifice fitting carrier assembly as set forth in claim 1 wherein said means to move said carrier body and said orifice disk in a second direction includes an alignment pin received through a seat in said carrier holding plate and into said orifice fitting and includes horizontal adjustment screw means to adjust the position of said alignment pin with respect to said plate so that adjustment of said horizontal screw means will move said carrier body and said orifice disk.

4. An adjustable orifice fitting carrier assembly as set forth in claim 3 wherein said horizontal adjustment screw means is accessible after said carrier body and said holding plate have been received in said receptacle.

5. An adjustable orifice fitting carrier assembly for an orifice fitting having a receptacle and interposed in a pipeline, which carrier assembly comprises:
   a) a carrier body receivable in said receptacle of said fitting to hold a flat circular orifice disk having a center orifice therethrough, said orifice disk perpendicular to the flow through said pipeline;
   b) a carrier holding plate receivable in said receptacle and in communication with said carrier body;
   c) means to move said carrier body and said orifice disk with respect to said holding plate in a first direction across the diameter of said pipeline while within said orifice fitting; and
   d) means to move said holding plate, thereby moving said carrier body and said orifice disk by moving said holding plate with respect to said orifice fitting in a second direction across the diameter of said pipeline, perpendicular to said first direction, in order to concentrically align said center orifice with the axis of said pipeline.

* * * * *